US010859819B2

United States Patent
Pauls et al.

(10) Patent No.: US 10,859,819 B2
(45) Date of Patent: Dec. 8, 2020

(54) METHOD FOR CHANGING A SURFACE VIA PARTICLE IRRADIATION

(71) Applicant: Carl Zeiss SMT GmbH, Oberkochen (DE)

(72) Inventors: Walter Pauls, Huettlingen (DE); Christoph Petri, Oberkochen (DE); Sebastian Vauth, Aalen (DE); Udo Kubon, Essingen (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 16 days.

(21) Appl. No.: 16/459,853

(22) Filed: Jul. 2, 2019

(65) Prior Publication Data

US 2020/0012091 A1 Jan. 9, 2020

(30) Foreign Application Priority Data

Jul. 4, 2018 (DE) ........................ 10 2018 210 995

(51) Int. Cl.
*G02B 27/00* (2006.01)
*H01J 37/302* (2006.01)
(Continued)

(52) U.S. Cl.
CPC ......... *G02B 27/0012* (2013.01); *G06F 30/00* (2020.01); *H01J 37/3023* (2013.01);
(Continued)

(58) Field of Classification Search
USPC .................................................... 250/492.1
See application file for complete search history.

(56) References Cited

U.S. PATENT DOCUMENTS

| 2011/0042839 A1* | 2/2011 | Tanimura ........... G01M 11/0257 264/2.2 |
| 2013/0271749 A1* | 10/2013 | Korb ................... G03F 7/70483 356/51 |
| 2019/0018324 A1 | 1/2019 | Pauls et al. |

FOREIGN PATENT DOCUMENTS

| DE | 10 2005 017 632 A1 | 10/2006 |
| DE | 10 2012 212 199 A1 | 6/2013 |

(Continued)

OTHER PUBLICATIONS

German Office Action, with translation thereof, for corresponding DE Appl No. 10 2018 210 995.8, dated Apr. 29, 2019.
(Continued)

*Primary Examiner* — Kiet T Nguyen
(74) *Attorney, Agent, or Firm* — Fish & Richardson P.C.

(57) ABSTRACT

A method for changing a shape of a surface of an optical element by particle irradiation includes: modelling the problem of determining a resulting change of the surface shape of the optical element from a control variable; determining a predefinition for the control variable of the particle irradiation from a predefined desired change of a surface shape of the optical element by ascertaining an extremum of a merit function; and radiating particles onto the surface of the optical element with a locally resolved effect distribution corresponding to the determined predefinition for the control variable, for the purpose of producing local surface changes at the surface of the optical element. Ascertaining the extremum corresponds to the solution of an Euler equation. The Euler equation defines an integral operator. The eigenvalues of the integral operator are determined, and the predefinition is a linear combination of a finite number of eigenfunctions of the integral operator.

20 Claims, 3 Drawing Sheets

(51) Int. Cl.
  *G06F 30/00* (2020.01)
  *G06F 17/15* (2006.01)
  *G06F 111/10* (2020.01)
(52) U.S. Cl.
  CPC .......... *G06F 17/15* (2013.01); *G06F 2111/10* (2020.01); *H01J 2237/317* (2013.01)

(56) References Cited

FOREIGN PATENT DOCUMENTS

DE   10 2016 203 591 A1   9/2017
WO   WO 2011/020655 A1   2/2011
WO   WO 2013/117343 A1   8/2013

OTHER PUBLICATIONS

Regularization of Inverse Problems, Engl, Heinz Werner, Hank, Martin, Neubauer, A., Kluwer Academic Publishers, 2000.

* cited by examiner

METHOD FOR CHANGING A SURFACE VIA PARTICLE IRRADIATION

CROSS-REFERENCE TO RELATED APPLICATIONS

This application claims priority to the German Patent Application No. 10 2018 210 995.8 filed on Jul. 4, 2018. The entire disclosure of this patent application is incorporated into the present application by reference.

FIELD

The disclosure relates to a device and a method for changing a shape of a surface of an object via particle irradiation.

BACKGROUND

DE 10 2012 212 199 A1 discloses, for example, a surface structuring of micro- or nanostructured components composed of glass or ceramic via electron irradiation. To that end, a particle beam, such as an electron beam, for instance, having a diameter in the region of the smallest structures to be produced can be directed onto selected partial regions of the surface in order to achieve a local densification and thus a local depression of the surface corresponding to the desired surface structuring. Furthermore, a description is given of processing of an optical element of a projection exposure apparatus for microlithography with an electron beam. Imaging aberrations of the projection exposure apparatus that are caused by the production process can be compensated for by a suitably implemented densification and an attendant change of the shape of the optical surface of the optical element. Particle beams can be used not only for the material densification described but also for direct removal of material at the surface of the irradiated object.

In order to control the electron irradiation, it is conventional practice firstly to determine an energy dose distribution which is to be introduced into the optical element by the irradiation and which is suitable to bring about a desired correction of the surface shape of the optical element on account of material densifications brought about thereby.

In accordance with known practice, the energy dose distribution is determined by a simulation of the effect of the incident energy dose distribution on a change of the surface shape. One typical issue here resides in taking account of the diverse boundary conditions and constraints, resulting from the design of the processing process and the characteristics of the processing device. Conventional processing devices therefore often fail to achieve the desired accuracy in the case of the surface shape change obtained.

SUMMARY

The disclosure seeks to provide a device and a method for changing a shape of a surface of an object via particle irradiation by which a desired change of surface shape of the object can be brought about with high accuracy.

The disclosure provides a method for changing a shape of a surface of an optical element via particle irradiation. The method includes the following steps: modelling the problem of determining a resulting change of the surface shape of the optical element from a control variable, determining a predefinition for the control variable of the particle irradiation from a predefined desired change of a surface shape of the optical element by ascertaining an extremum of a merit function, and radiating particles onto the surface of the optical element with a locally resolved effect distribution corresponding to the determined predefinition for the control variable, for the purpose of producing local surface changes at the surface of the optical element. According to the method the ascertaining of the extremum corresponds to the solution of an Euler equation, the Euler equation defines an integral operator, the eigenvalues of the integral operator are determined, and the predefinition is a linear combination of a finite number of eigenfunctions of the integral operator.

In accordance with one embodiment the modelling of the problem of determining a resulting change of the surface shape of the optical element from a control variable involves carrying out a convolution of the control variable with a tool function describing the effect potential of a particle irradiation unit effecting the particle irradiation.

In accordance with a further embodiment the eigenvalues of the eigenfunctions in each case do not fall below a predefined limit value. In particular, the eigenvalues are positive, real numbers In accordance with a further embodiment the magnitude of the eigenvalues of the integral operator corresponds in each case to an efficiency of the particle irradiation unit on the surface of the optical element in relation to a respectively assigned structure of a shape changed to be produced in the surface.

In accordance with a further embodiment the integral operator is calculated numerically as a diagonal matrix. In accordance with an embodiment variation the diagonal matrix is formed via tool function describing the effect potential of the particle irradiation unit.

In accordance with a further embodiment the modelling leads to an ill-defined inverse function and the merit function is configured to select a suitable solution from a cluster of solutions to the ill-defined inverse problem.

In accordance with a further embodiment the merit function includes predefined coefficients which characterize the locally resolved effect distribution.

In accordance with a further embodiment the merit function contains a Tichonov regularization.

In accordance with a further embodiment the optimization of the merit function is carried out on the basis of external constraints.

In accordance with an embodiment variation the control variable includes a residence time of a particle beam on a corresponding point of the surface during the irradiation and the external constraints include a low-pass filter for the residence time of the particle beam.

In accordance with a further embodiment the control variable includes a residence time of a particle beam on a corresponding point of the surface during irradiation and the external constraints include gradient limitations to the residence time of the particle beam.

In accordance with a further embodiment the particles are radiated onto the surface of the optical element with a predefined optical footprint and eigenfunctions assigned to the eigenvalues satisfy boundary conditions adapted to the optical footprint. In the case, in which the object is configured as an optical element of an exposure tool for microlithography, an optical footprint can be defined as the area of the surface, which is irradiated by exposure radiation during operation of the exposure tool.

Further, according to the disclosure a method for correcting a projection lens of a microlithographic exposure apparatus is provided, including the following steps: measuring a wavefront aberration of the projection lens, demounting a first optical element of the projection lens, changing the shape of the surface of a second optical element via the method in any of the previously described embodiments, and installing the second optical element instead of the first optical element into the projection lens.

Further, according to the disclosure an optical element for a projection lens of a microlithographic exposure apparatus having a surface shape is provided. The optical element is produced by a method including the following steps: modelling the problem of determining a resulting change of the surface shape of the optical element from a control variable, determining a predefinition for the control variable of the particle irradiation from a predefined desired change of a surface shape of the optical element by ascertaining an extremum of a merit function, and radiating particles onto the surface of the optical element with a locally resolved effect distribution corresponding to the determined predefinition for the control variable, for the purpose of producing local surface changes at the surface of the optical element, wherein the ascertaining of the extremum corresponds to the solution of an Euler equation, the Euler equation defines an integral operator, the eigenvalues of the integral operator are determined, and the predefinition is a linear combination of a finite number of eigenfunctions of the integral operator.

The optical element can be an optical element, in form of a lens or a mirror, provided by design for forming the optical path of the projection lens. Alternatively the optical element can also be a correction element of the projection lens in form of a plate having in sections plane parallel surfaces.

The problem mentioned above can further be solved according to the disclosure for example by a device for changing a shape of a surface of an object via particle irradiation. This device includes a particle irradiation unit configured, as a function of a control variable, to radiate particles onto the surface of the object with a locally resolved effect distribution for the purpose of producing local surface changes, and a control unit configured to determine, from a predefined desired change of a surface shape of the object, a predefinition for the control variable of the particle irradiation unit by optimization via a merit function. The merit function contains eigenvalues of an operator which results from a modelling of the problem of determining a resulting change of the surface shape of the object from the control variable.

In other words, the aforementioned operator results from the modelling of the problem of how the effect distribution results from the control variable. The merit function results from the solution to the auxiliary problem of ascertaining the eigenvalues of the operator K. The merit function in turn is used to determine the predefinition for the control variable via optimization calculation. The predefinition serves for controlling the particle irradiation unit for the purpose of producing a locally resolved effect distribution of the particle irradiation such that the predefined desired change is produced at the surface. The optimization via the merit function can be carried out by optimizing the merit function as sole merit function or by optimizing a plurality of merit functions including the merit function mentioned. A merit function is often also referred to as "target function".

The effect distribution can be for example a density and/or velocity distribution of the incident particles and, particularly in the case of charged particles, such as electrons or ions, for instance, an energy dose distribution of the incident particles. The control variable can be for example a residence time of a particle beam on a corresponding point of the surface during the irradiation, a scanning speed of the particle beam or an intensity setting of the particle beam. The change of the surface of the object can be carried out for example by removal of material or local material densification, so-called compaction, in the object. The object to be processed can be an optical element, such as a mirror or a lens element, for instance, which is provided in particular for use in a microlithographic projection exposure apparatus, such as, for instance, a projection lens or an illumination system of the projection exposure apparatus. The projection exposure apparatus can use in particular EUV radiation or DUV radiation as exposure radiation.

The particles used for the particle irradiation can be charged particles, in particular ions or electrons, as is the case in apparatuses for IBF surface processing or electron beam figuring apparatuses. IBF here stands for the English expression "ion beam figuring". Alternatively, non-charged particles can also be used. This involves neutralizing ions before impingement on the surface in order to avoid charging.

The measure according to the disclosure of providing in the merit function eigenvalues of an operator which results from a modelling of the problem of determining a resulting change of the surface shape of the object from the control variable makes it possible to determine the predefinition for the control variable of the particle irradiation unit by optimization via the merit function with high precision. The predefinition thus determined makes it possible, in turn, to control the particle irradiation unit in such a way that the desired change of the surface shape at the object is produced with high accuracy.

In accordance with one embodiment, fixed values or limit values are predefined for the eigenvalues in the merit function via which the optimization is carried out. That is to say that the fixed values or limit values are ascertained before the optimization carried out via the merit function is performed.

In accordance with a further embodiment, the eigenvalues of the operator in each case define an efficiency of the influence of the particle irradiation unit on the surface of the object in relation to a respectively assigned structure of a shape change to be produced in the surface.

In accordance with a further embodiment, the operator is configured as a diagonal matrix. According to one embodiment variant, the diagonal matrix is formed via a tool function describing the effect potential of the particle irradiation unit.

In accordance with a further embodiment, the modelling of the problem of determining a resulting change of the surface shape of the object from the control variable is based on a convolution of a tool function describing the effect potential of the particle irradiation unit with the control variable.

In accordance with a further embodiment, the modelling leads to an ill-defined inverse problem and the merit function is configured to select a suitable solution from a cluster of solutions to the ill-defined inverse problem. In particular, the suitable solution is selected on the basis of boundary conditions and/or constraints, i.e. via regularization.

In accordance with a further embodiment, the merit function includes predefined coefficients which characterize the locally resolved effect distribution. That is to say that the values of the coefficients mentioned are predefined in the merit function via which the optimization is carried out.

In accordance with a further embodiment, the merit function contains a Tikhonov regularization. As is known to the person skilled in the art, in the case of a Tikhonov regularization, the merit function contains a so-called penalty term, which serves to counteract a deviation of the optimization variables from an initial value during the optimization.

In accordance with a further embodiment, the optimization of the merit function is carried out on the basis of external constraints. A constraint should be understood to mean a boundary condition and/or a constraint. An external constraint is a constraint that is described outside the merit function.

In accordance with a further embodiment, the device is configured as an ion beam figuring apparatus. Such ion beam figuring apparatuses are also known as apparatuses for IBF surface processing.

In accordance with a further embodiment, the device is configured as an electron beam figuring apparatus.

Furthermore, the disclosure provides a method for changing a shape of a surface of an object via particle irradiation. The method includes modelling the problem of determining a resulting change of the surface shape of the object from a control variable, and ascertaining eigenvalues of a resultant operator. Furthermore, the method includes determining a predefinition for a control variable of the particle irradiation from a predefined desired change of a surface shape of the object by optimization via a merit function, wherein the merit function contains the eigenvalues of the operator, and radiating particles onto the surface of the object with a locally resolved effect distribution corresponding to the determined predefinition for the control variable, for the purpose of producing local surface changes.

In accordance with one embodiment of the method according to the disclosure, the merit function results from the ascertainment of the eigenvalues which is carried out via the modelling of the problem of determining a resulting change of the surface shape of the object from a control variable.

In accordance with a further embodiment, the modelling of the problem of determining a resulting change of the surface shape of the object from a control variable involves carrying out a convolution of the control variable with a tool function describing the effect potential of a particle irradiation unit effecting the particle irradiation.

The features specified with respect to the aforementioned embodiments, exemplary embodiments or embodiment variants, etc., of the device according to the disclosure can be correspondingly applied to the method according to the disclosure, and vice versa. These and other features of the embodiments according to the disclosure are explained in the description of the figures and in the claims. The individual features can be implemented, either separately or in combination, as embodiments of the disclosure. Furthermore, they can describe advantageous embodiments which are independently protectable and protection for which is claimed if appropriate only during or after pendency of the application.

BRIEF DESCRIPTION OF THE DRAWINGS

The above and further advantageous features of the disclosure are illustrated in the following detailed description of exemplary embodiments according to the disclosure with reference to the accompanying schematic drawings, in which.

DETAILED DESCRIPTION OF EXEMPLARY EMBODIMENTS

In the exemplary embodiments or embodiments or embodiment variants described below, elements which are functionally or structurally similar to one another are provided with the same or similar reference signs as far as possible. Therefore, for understanding the features of the individual elements of a specific exemplary embodiment, reference should be made to the description of other exemplary embodiments or the general description of the disclosure.

Figure 1:
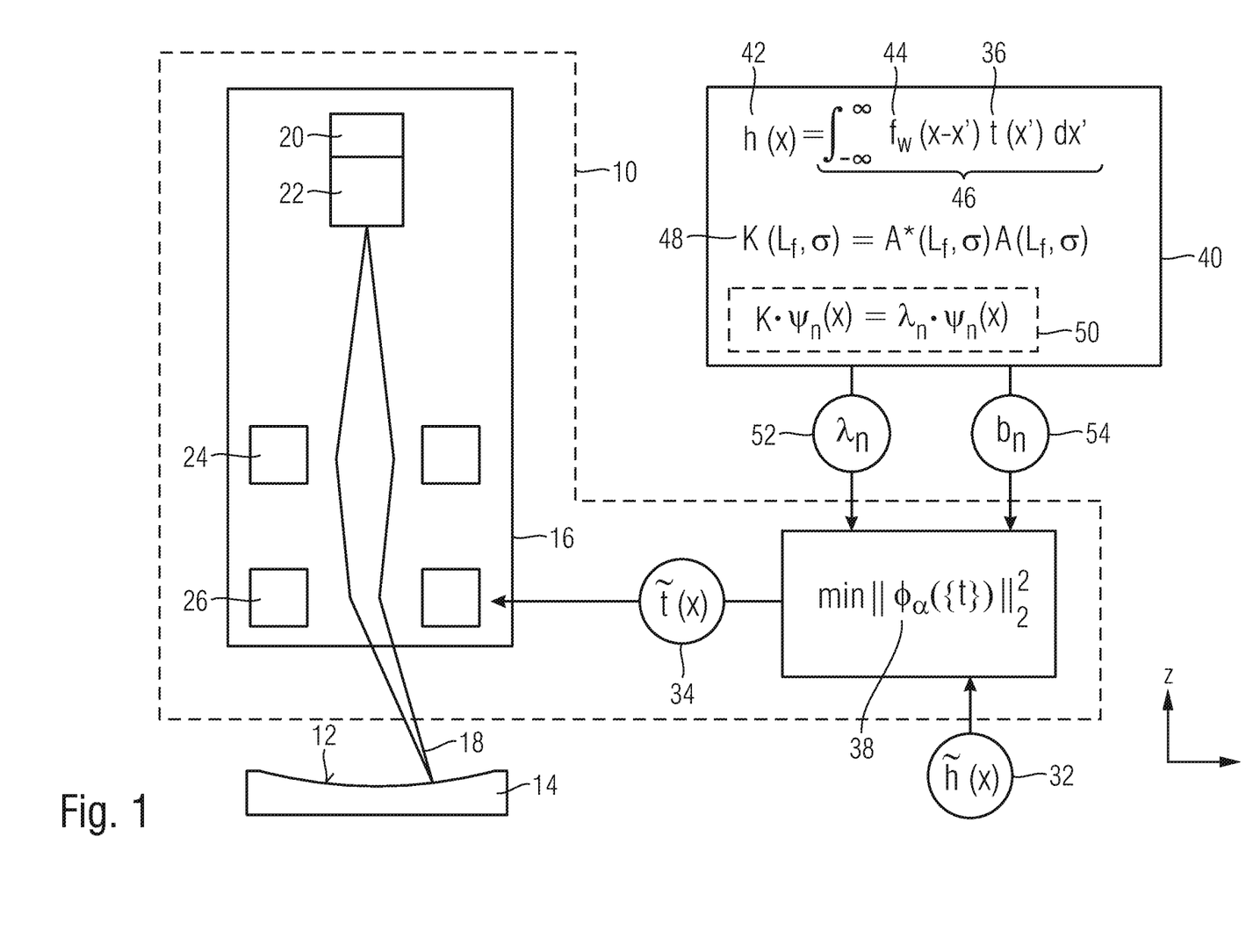
FIG. 1 shows one exemplary embodiment of a device for changing a shape of a surface of an object via particle irradiation in the form of an electron beam figuring device including a control unit, via which a merit function containing eigenvalues is optimized.

In order to facilitate the description, FIG. 1 indicates a coordinate system which reveals the respective positional relationship of the components illustrated in the figures. In this case, the x-direction extends towards the right, and the z-direction extends upwards. The formulae indicated in FIG. 1 relate to a model which is limited to one dimension (x) for the sake of simplicity. Therefore, FIG. 1 dispenses with indicating the y-coordinate axis. With corresponding extension to a two-dimensional model (x/y), the coordinate system from FIG. 1 should be extended by the y-coordinate axis extending perpendicularly to the plane of the drawing.

FIG. 1 schematically illustrates one exemplary embodiment of a device 10 for changing a shape of a surface 12 of an object in the form of an optical element 14 via electron irradiation. By way of example, a mirror for the EUV wavelength range, i.e. for electromagnetic radiation having a wavelength of less than 100 nm, in particular a wavelength of approximately 13.5 nm or approximately 6.7 nm, is provided as optical element 14. This can be a mirror for a projection lens or for a mask illumination system of a projection exposure apparatus for EUV microlithography. However, the device 10 is also suitable for highly accurate surface shape production or surface shape change for other optical elements, such as, for example, mirrors for other wavelength ranges, lens elements or optical elements having diffractive structures, or else for objects which do not form an optical element.

The device 10 contains a particle irradiation unit 16 for generating a particle beam 18 that is directed and focused onto selectable locations of the surface 12. In the case illustrated, electrons are involved and the particle irradiation unit 16 is thus an electron irradiation unit. In other embodiment variants, it is also possible to use ions, for instance in apparatuses for IBF surface processing, or uncharged particles. With the use of ions, the latter are typically neutralized after acceleration in the electric field and before impingement on the surface. The particle beam 18 is configured energetically in particular in such a way that a more or less greatly pronounced local removal or a more or less greatly pronounced local compaction of the material of the optical element 14 at the surface 12 is brought about depending on the energy dose. Energy dose should be understood to mean the energy per area which is introduced into the optical element 14 by the particle beam 18. The energy dose is thus dependent in particular on the residence duration of the electron beam at the selected location and on the intensity of the electron beam.

Both a material removal and a local compaction bring about a local depression of the surface 12 at the optical element 14. A compaction occurs as a result of a redistribution of electron bonds in particular in amorphous materials. In this case, the local compaction is effected in all spatial directions, that is to say that not only a local surface depression in the region of an area element in the negative z-direction but also a compaction parallel to the surface 12 takes place. In this case, forces acting parallel to the surface 12 arise, as a result of which stresses are induced in the optical element 14. The stresses can bring about a deformation of a surface section that is significantly larger than the area element affected by the local compaction. The surface section can include a part of the surface 12 or else the entire surface 12.

In order to generate the particle beam 18 in the form of an electron beam, the particle irradiation unit 16 contains an electron source 20 and an acceleration unit 22. By way of example, an incandescent cathode, a crystal cathode or a field emission cathode can be used as the electron source 20. The acceleration unit 22 accelerates and focuses the electrons emitted by the electron source 20. To that end, the acceleration unit 22 can have an anode having a high positive electrostatic potential relative to the electron source 20 and having a small exit opening for the accelerated electrons. For focusing and for setting the intensity of the particle beam 18, the acceleration unit 22 furthermore contains a control electrode, for example a Wehnelt cylinder. The intensity or the beam current indicates the number of electrons which pass through an imaginary area perpendicular to the electron beam per unit time.

For focusing the particle beam 18 coming from the acceleration unit 22, the particle irradiation unit 16 furthermore includes a focusing unit 24 having suitably configured electrical or magnetic components.

Via a deflection unit 26 of the particle irradiation unit 16, the particle beam 18 can be deflected in the x-direction in the illustration restricted to one dimension in accordance with FIG. 1, generally both in the x-direction and in the y-direction. For this purpose, the deflection unit 26 likewise contains suitably configured electrical or magnetic components. Depending on the setting of the deflection unit 26, the particle beam 18 impinges on the surface 12 of the optical element 14 at a specific location (x in accordance with the illustration in FIG. 1 or generally (x, y)).

In this way, a multiplicity of different locations of the surface 12 can be irradiated successively and a locally resolved effect distribution in the form of an energy dose distribution over the surface 12 can thus be achieved. The locally resolved energy dose distribution should be understood here to mean a distribution of the introduced energy per area as a function of the surface coordinate x (generally the surface coordinates (x, y)) of the surface 12 of the optical element 14. In this case, the irradiation can be carried out for example in a raster-like manner or else continuously over the entire surface. Moreover, an irregular or regular arrangement of different locations to be irradiated, for instance in lines, circles, ellipses or the like, is possible.

In order to avoid absorption of the electrons of the particle beam 18 by air, the particle irradiation unit 16 furthermore has a vacuum chamber, in which the electron source 20, the acceleration unit 22, the focusing unit 24, the deflection unit 26 and the optical element 14 or at least the surface 12 of the optical element 14 are arranged.

The device 10 furthermore contains a control unit 30 for controlling the particle irradiation unit 16. The control unit 30 is configured in particular to determine, from a predefined desired change 32 for the shape of the surface 12 of the optical element 14, a predefinition 34 for a control variable 36 of the particle irradiation unit 16 for the irradiation of the surface 12 with the particle beam 18, with which the desired change 32 of the shape of the surface 12 is achieved very accurately. The predefinition 34 of the control variable 36 brings about the production of the above-described effect distribution in the form of the energy dose distribution in a suitable manifestation.

For the purpose of ascertaining the control variable predefinition 34, the control unit 30 is configured for optimizing a merit function 38. The merit function 38 includes eigenvalues 52 of an operator 48 which results from a modelling of the problem of determining a resulting change 42 of the surface shape of the optical element 14 from the control variable 36. The modelling of the problem is carried out via a modelling unit 40. The modelling unit 40 can be part of the device 10 or else form a separate device. In the present embodiment, the modelling unit 40 is not part of the device 10.

For the purpose of modelling the problem, the change 42 of the surface shape is described as a convolution 46 of a tool function 44 describing the effect potential of the particle irradiation unit 16 with the control variable 36. The modelling results in an operator A and multiplying the latter by its adjoint operator A* results in the operator 48 in the form of a diagonal matrix. By solving the eigenvalue problem 50 described via the eigenvalue equation $$K\cdot\psi_n(x)=\lambda_n19\ \psi_n(x) \qquad (1)$$

the eigenvalues 52 are ascertained and transferred to the control unit 30. In expression (1), K denotes the operator 48, $\lambda_n$ denotes the eigenvalues 52 and $\psi_n(x)$ denotes associated eigenfunctions.

Furthermore, the merit function 38 includes coefficients 54 characterizing the locally resolved effect distribution of the particle beam 18 incident on the surface 12. The coefficients 54 are likewise determined by the modelling unit 40 and communicated to the control unit 30. The embodiment of the optimization module 30 and of the modelling unit 40 as illustrated in FIG. 1 is explained in detail below with regard to construction and functioning.

In many applications in which surfaces 12 are processed with the aid of particle beams 18, the surface change, which can be represented by a function of the spatial coordinates, is linearly dependent on the residence time of the processing tool, in the present case the particle irradiation unit 16, over the surface 12.

As already mentioned above, changes 42 of the surface shape along only one coordinate x are considered in order to facilitate the description. In the present case, the changes 42 of the surface shape are designated h(x). The effect of the tool in the form of the particle irradiation unit 16 is characterized by the so-called tool function 44, which is designated by $f_W(x)$, wherein the surface changes established as a result of the tool being situated above a point during the residence duration t(x), which represents the control variable 36, can be written as the abovementioned convolution 46 as follows:

$$h(x)=\int_{-\infty}^{\infty}f_W(x-x')t(x')dx' \qquad (2)$$

It should be noted that the effect range of the particle beam 18 can be limited by stops and other devices. In this case, the integration range is likewise limited. The following form is formulated here for the tool function 44:

$$f_\sigma(x) = \frac{1}{\sqrt{2\pi\sigma^2}} e^{-\frac{x^2}{2\sigma^2}}. \quad (3)$$

A typical task in surface processing is the calculation of machine control predefinitions, such as the residence duration t(x), from a predefined desired change 32 of the surface shape, which is designated below by $\tilde{h}(x)$. The desired surface change typically need not be obtained for all spatial points, but rather for a specific range, in our case the evaluation interval $[-L_f, L_f]$. As will become clear later, it is not expedient to attempt to ascertain the residence duration t(x) by solving the equation $$\tilde{h}(x) ``=" \int_{-\infty}^{\infty} f_\sigma(x-x')t(x')dx' \quad (4)$$

This involves a typical inverse problem which is ill defined in the Hadamardian sense.

The simplest and most common procedure is offered by the method of least squares in the sense of the $L^2$-norm on the space of the square-integrable functions over the evaluation range $[-L_f, L_f]$. In principle, other methods would be conceivable, too, in which the merit function is defined by an $L^1$-norm, for example the method of least absolute deviations with the $L^1$-norm. These variants will not be considered in further detail here. The customary quadratic merit function $\Phi(t)$ is defined by way of the $L^2$-norm of the difference between the surface change obtained via a residence duration t(x) and the desired surface change (h(x)–$\tilde{h}$(x)):

$$\|h-\tilde{h}\|^2_{L^2([-L_f,L_f])} = \int_{-L_f}^{L_f} (h(x)-\tilde{h}(x))^2 dx \quad (5)$$

and has the form $$\Phi(\{t\}) = \tfrac{1}{2}\int_{-L_f}^{L_f} (\int_{-\infty}^{\infty} f_\sigma(x-x')t(x')dx' - \tilde{h}(x))^2 dx. \quad (6)$$

It should be noted that this merit function is defined apart from a constant. A residence duration t(x) which minimizes this merit function and possibly satisfies additional constraints is regarded as a solution to the inverse problem.

The present problem can be tackled in a natural way with the aid of functional analytical concepts. The effect of the tool, which acts during the residence duration t(x), on the surface shall be described with the aid of an operator $A(L_f,\sigma):L^2(\mathbb{R}) \to L^2([-L_f,L_f])$:

$$(A(L_f,\sigma)t)(x) = \int_{-\infty}^{\infty} f_\sigma(x-x')\chi_{[-L_f,L_f]}(x)dx', \quad (7)$$

which is taken into account only in the relevant range $[-L_f, L_f]$ ($\chi_{[-L_f, L_f]}$ is the indicator function of the interval $[-L_f, L_f]$). A merit function is then written as $$\Phi(\{t\}) = \tfrac{1}{2}\|A(L_f\sigma)t-\tilde{h}\|^2_{L^2([-L_f,L_f])} = \tfrac{1}{2}\langle A^*(L_f,\sigma)A(L_f,\sigma)t, t\rangle_{L^2(\mathbb{R})} - \langle A^*(L_f,\sigma)\tilde{h}, t\rangle_{L^2(\mathbb{R})} + \tfrac{1}{2}\|\tilde{h}\|^2_{L^2([-L_f,L_f])}, \quad (8)$$

wherein the adjoint operator $A^*(L_f,\sigma):L^2([-L_f,L_f]) \to L^2(\mathbb{R})$ is given by $$(A^*(L_f,\sigma)f)(x) = \int_{-L}^{L} f_\sigma(x-x')\chi_{[-L_f,L_f]}(x')dx' \quad (9)$$

The extremum of the merit function is determined by the Euler equation $$A^*(L_f,\sigma)A(L_f,\sigma)t = A^*(L_f,\sigma)\tilde{h}, \quad (10)$$

The operator—also designated by the reference sign 48 in FIG. 1—

$$K(L_f,\sigma) = A^*(L_f,\sigma)A(L_f,\sigma)A(L_f,\sigma) \quad (11)$$

is a self-adjoint integral operator with the kernel $$g_\sigma(x', x'') = \int_{-L_f}^{L_f} f_\sigma(x-x')f_\sigma(x-x'')dx \quad (12)$$

$$= \frac{1}{2\pi\sigma^2} e^{-\frac{(x'-x'')^2}{4\sigma^2}} \int_{-L_f}^{L_f} e^{-\frac{\left(x-\frac{x'+x''}{2}\right)^2}{\sigma^2}} dx$$

$$= \frac{1}{2}\frac{1}{\sqrt{4\pi\sigma^2}} e^{-\frac{(x'-x'')^2}{4\sigma^2}}$$

$$\left[\operatorname{erf}\left(\frac{x'+x''+2L_f}{2\sigma}\right) - \operatorname{erf}\left(\frac{x'+x''-2L_f}{2\sigma}\right)\right].$$

Furthermore, $K(L_f, \sigma)$ is a Hilbert-Schmidt operator. For the solution to equation (10), it is desirable to ascertain the (discrete) spectrum of $K(L_f, \sigma)$ together with the associated eigenspaces, i.e. the eigenvalues $\lambda_n$ are ascertained by solving the eigenvalue problem 50 described via the eigenvalue equation indicated under expression (1).

Since $K(L_f, \sigma)$ is strictly positive in the sense of ordered vector spaces, i.e. for arbitrary strictly positive residence durations the associated change is strictly positive, the highest eigenvalue $\lambda_n$ of $K(L_f, \sigma)$ is strictly positive. The associated eigenfunction $\psi_n$ is likewise strictly positive, which follows from the Krein-Rutman theorem. The simple estimation of this eigenvalue follows from Young's inequality:

$$\lambda_1 \leq \int_{-\infty}^{\infty} f_\sigma(x)dx = 1 \quad (13)$$

Furthermore, $K(L_f, \sigma)$ has no spectral gap, $\lim_{n\to\infty}\lambda_n=0$.

That is to say that the numerical calculation considers the kernel (expression (12)) of the operator $K(L_f, \sigma)$ over a finite interval $[-L; L]$, wherein L is chosen to be much greater than $L_f$. The continuous x-coordinate is replaced by an equidistant grid, which is fine enough.

Figure 2:
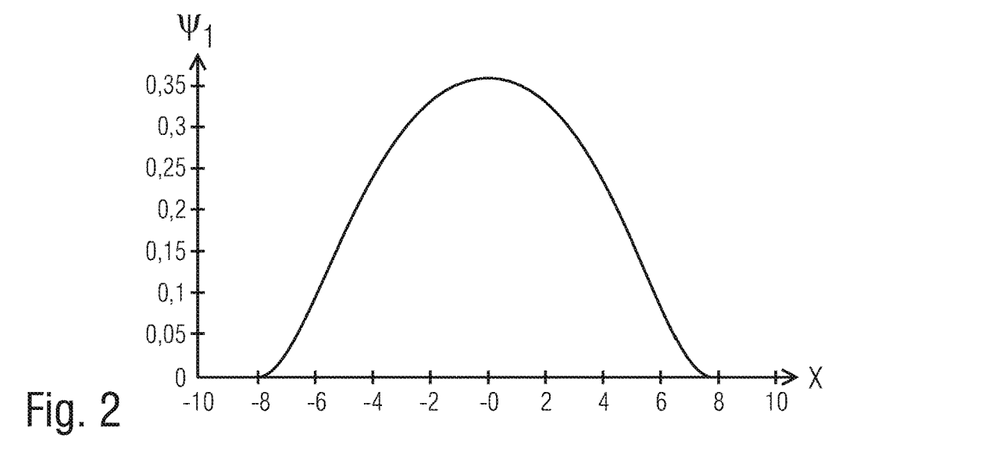
FIG. 2 shows one example of an eigenfunction $\psi_1$ assigned to an eigenvalue $\lambda_1$.
Figure 3:
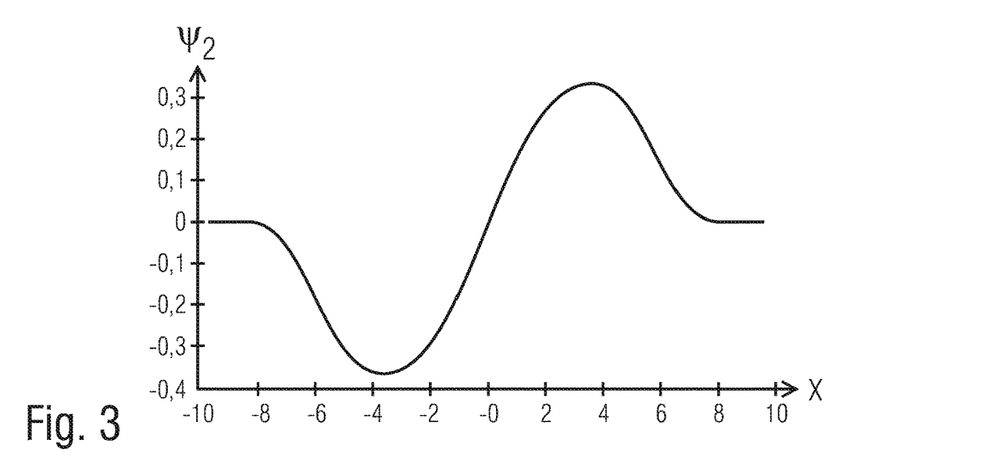
FIG. 3 shows one example of an eigenfunction $\psi_2$ assigned to an eigenvalue $\lambda_2$.
Figure 4:
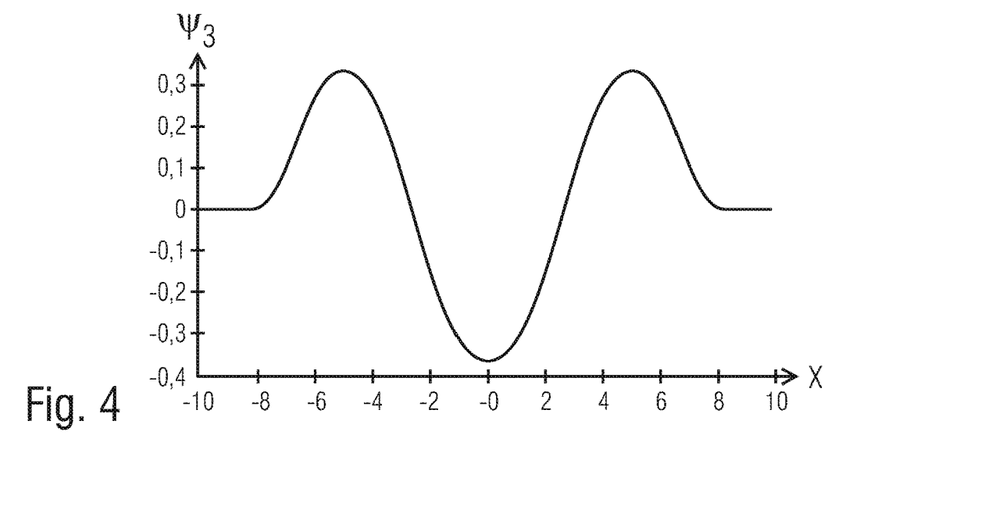
FIG. 4 shows one example of an eigenfunction $\psi_3$ assigned to an eigenvalue $\lambda_3$.

The eigenfunction $\psi_1$ with respect to the highest eigenvalue $\lambda_1$ is illustrated in FIG. 2 and is strictly positive ($\lambda_1$=0.98883516485, L=10, $L_f$=7). It falls to zero at the edge. Higher-order eigenfunctions with respect to eigenvalues $\lambda_2$, $\lambda_3$ . . . have oscillations, wherein the number of oscillation periods increases with the function order—see FIGS. 3 and 4 for eigenfunctions $\psi_2$ and $\psi_3$ with respect to the eigenvalues $\lambda_2$ ($\lambda_2$=0.9560906702, L=10, $L_f$=7) and $\lambda_3$ ($\lambda_3$=0.90393245233, L=10, $L_f$=7).

Figure 5:
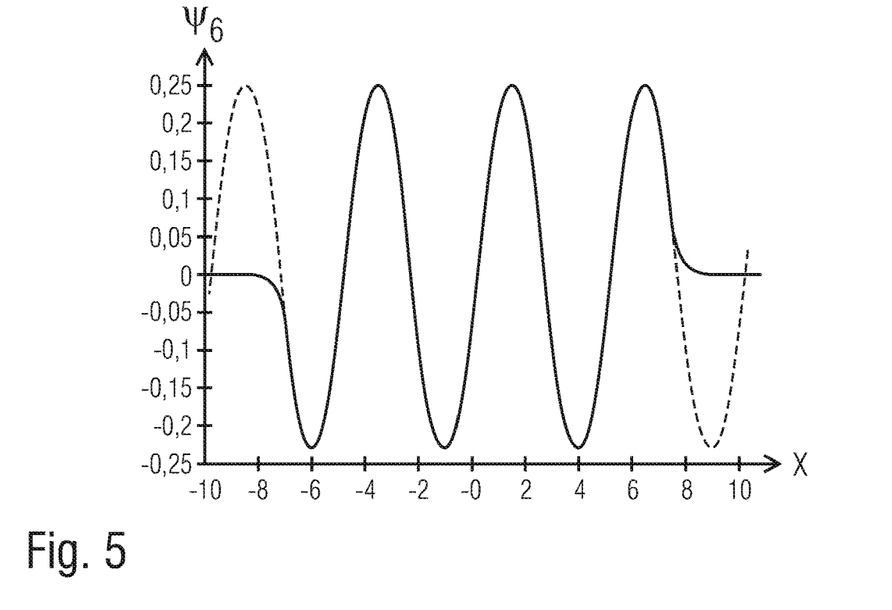
FIG. 5 shows one example of an eigenfunction $\psi_6$ assigned to an eigenvalue $\lambda_6$.
Figure 6:
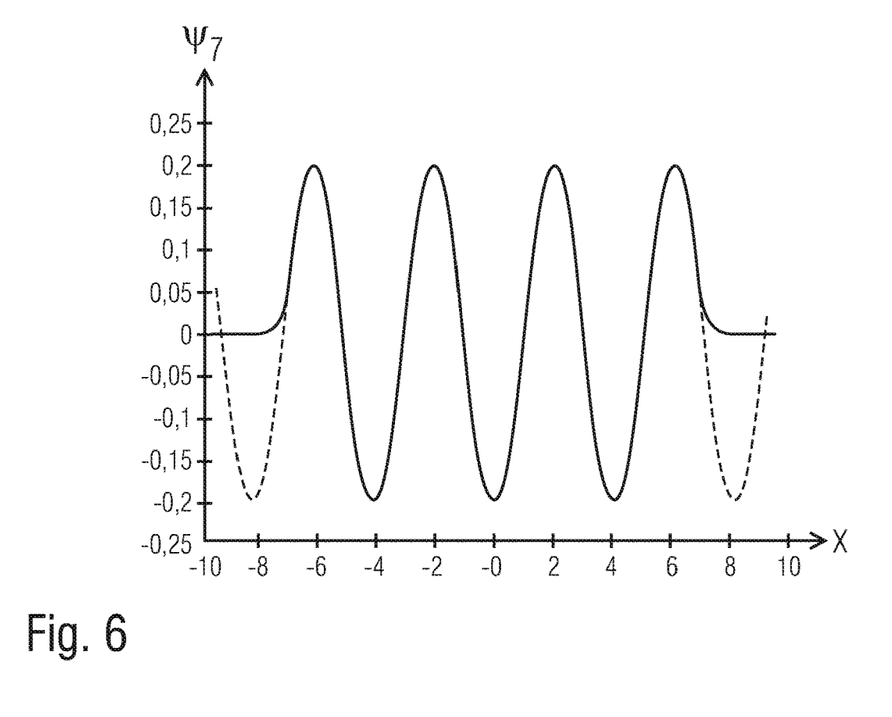
FIG. 6 shows one example of an eigenfunction $\psi_7$ assigned to an eigenvalue $\lambda_7$.

Within the interval, the eigenfunctions $\psi_n$ are described very well by the sine functions $$\sin\frac{2\pi}{2L_f}\omega_n x$$

and the cosine functions $$\cos\frac{2\pi}{2L_f}\omega_n x;$$

see FIGS. 5 and 6 (eigenfunctions $\psi_6$ and $\psi_7$ with respect to the eigenvalues $\psi_6$=0.66807975974 and $\lambda_7$=0.57777692918). Over the evaluation range $[-L_f, L_f]$, the eigenfunctions have a well-defined parity, with frequencies rendered approximately by the formula $$\omega_n = \left(\frac{1}{2} - \frac{\pi}{4}\frac{\sigma}{2L_f}\right)n + \ldots \quad (14)$$

The eigenvalues $\lambda_n$ can be described by the formula $$\lambda_n = e^{-\alpha\frac{\sigma^2}{2L_f^2}\omega_n^2} \quad (15)$$

wherein $\alpha \approx 0.49352$.

It should be noted that "eigenvalues" of the Weierstrass transform with respect to the "eigenfunctions" sine and cosine have a similar (but continuous) spectrum:

$$W(\sin \omega x) = e^{-\omega^2} \sin \omega x, \quad W(\cos \omega x) = e^{-\omega^2} \cos \omega x \quad (16)$$

As follows from the previous explanations, the spectrum of the operator $K(L_f, \sigma)$ falls relatively rapidly, specifically all the more rapidly, the greater the width a of the tool function. This has the effect that calculating the direct solutions to the Euler equation (10) involves dividing by very small numbers. Consequently, none of the three Hadamardian conditions is met, i.e.:

1. The problem of ascertaining the residence time does not always have a solution in the $L^2$ sense.
2. If there is a solution, it is not necessarily uniquely determined.
3. Possible solutions are unstable in relation to changes in the input data (predefinitions for the surface changes).

The problem of ascertaining the residence time can be regularized in at least two ways. The customary method from a mathematical standpoint is Tikhonov regularization, which involves adding the additional term $\alpha\|t\|^2_{L^2(\mathbb{R})}$ to the merit function presented in expression (6):

$$\Phi_\alpha(\{t\}) = \frac{1}{2}\langle A^*(L_f\sigma)A(L_f\sigma)t, t\rangle_{L^2(\mathbb{R})} - \langle A^*(L_f\sigma)\tilde{h}, t\rangle_{L^2(\mathbb{R})} \frac{1}{2}\|\tilde{h}\|^2_{L^2([-L_f,L_f])} + \alpha\|t\|^2_{L^2(\mathbb{R})} \quad (17)$$

The parameter a prevents the $L^2$-norm of solutions from becoming too large. The other approach is to use, during the calculation of the residence time duration $t(x)$, the decomposition thereof with respect to the basis functions of the operator $K(L_f, \sigma)$, which shall be designated as $\varphi_n(x) \in L^2(\mathbb{R})$:

$$t(x) = \sum_{n=1}^{\infty} a_n \phi_n(x). \quad (18)$$

The input data $A^*(L_f\sigma)\tilde{h}$ are likewise expanded with respect to $\Phi_n(x)$:

$$A^*(L_f\sigma)\cdot\tilde{h} = \Sigma b_n \cdot \Phi_n(x) \quad (19)$$

In this case, the coefficients $b_n$ are the coefficients 54 already mentioned above, which characterize the locally resolved effect distribution of the particle beam 18 incident on the surface 12.

The merit function can then be written as a sum:

$$\Phi_\alpha(\{t\}) = \sum_{n=1}^{\infty}\left[\frac{\lambda_n + \alpha}{2}a_n^2 - a_n b_n\right]. \quad (20)$$

In practice, the sum is terminated starting from a specific order N, such that the merit function represents a finite sum:

$$\Phi_\alpha(\{t\}) = \sum_{n=1}^{N}\left[\frac{\lambda_n + \alpha}{2}a_n^2 - a_n b_n\right]. \quad (21)$$

This merit function is then used by the control unit 30 as merit function 38 for ascertaining the control variable predefinition 34, which is designated as $\tilde{t}(x)$ in FIG. 1, via numerical optimization.

The sought predefinition $\tilde{t}(x)$ of the residence duration can also be limited by various constraints. The physical constraint is positivity of the resulting residence duration, $$\sum_{n=1}^{N} a_n \phi_n(x) \geq 0. \quad (22)$$

Other constraints are conceivable, thus for example limitations of the surface changes from above, or low-pass filters in the residence time, resulting from the dynamic characteristic of the processing machines. It is advantageous to formulate the possible technical limitations as linear constraints.

The above description of exemplary embodiments, embodiments or embodiment variants is to be understood to be by way of example. The disclosure effected thereby firstly enables the person skilled in the art to understand the present disclosure and the advantages associated therewith, and secondly encompasses alterations and modifications of the described structures and methods that are also obvious in the understanding of the person skilled in the art. Therefore, all such alterations and modifications, insofar as they fall within the scope of the disclosure in accordance with the definition in the accompanying claims, and equivalents are intended to be covered by the protection of the claims.

LIST OF REFERENCE SIGNS

10 Device for changing the shape of a surface
12 Surface
14 Optical element
16 Particle irradiation unit
18 Particle beam
20 Electron source
22 Acceleration unit
24 Focusing unit
26 Deflection unit
30 Control unit
32 Predefined desired change
34 Predefinition for the control variable
36 Control variable
38 Merit function
40 Modelling unit
42 Change of surface shape
44 Tool function
46 Convolution
48 Operator
50 Eigenvalue problem
52 Eigenvalues
54 Coefficients

What is claimed is:

1. A method, comprising:
modelling a problem of determining a resulting change of a surface shape of an optical element from a control variable of a particle irradiation;
determining a predefinition for the control variable of the particle irradiation from a predefined desired change of a surface shape of the optical element by ascertaining an extremum of a merit function; and
irradiating particles onto the surface of the optical element with a locally resolved effect distribution corresponding to the determined predefinition for the control variable, thereby producing local surface changes at the surface of the optical element,
wherein:
ascertaining of the extremum corresponds to a solution of an Euler equation;
the Euler equation defines an integral operator;
eigenvalues of the integral operator are determined; and
the predefinition is a linear combination of a finite number of eigenfunctions of the integral operator.

2. The method of claim 1, wherein modelling comprises carrying out a convolution of the control variable with a tool function describing an effect potential of a particle irradiation unit effecting the particle irradiation.

3. The method of claim 1, wherein the eigenvalues of the eigenfunctions in each case do not fall below a predefined limit value.

4. The method of claim 1, wherein a magnitude of the eigenvalues of the integral operator corresponds in each case to an efficiency of the particle irradiation unit on the surface of the optical element in relation to a respectively assigned structure of a shape changed to be produced in the surface.

5. The method of claim 1, wherein the integral operator is calculated numerically as a diagonal matrix.

6. The method of claim 5, wherein the diagonal matrix is formed via a tool function describing the effect potential of a particle irradiation unit.

7. The method of claim 1, wherein modelling leads to an ill-defined inverse function configured to select a suitable solution from a cluster of solutions to an ill-defined inverse problem.

8. The method of claim 1, wherein the merit function comprises predefined coefficients which characterize the locally resolved effect distribution.

9. The method of claim 1, wherein the merit function contains a Tichonov regularization.

10. The method of claim 1, wherein the optimization of the merit function is carried out on the basis of external constraints.

11. The method of claim 10, wherein the control variable comprises a residence time of a particle beam on a corresponding point of the surface during the irradiation, and the external constraints comprise a low-pass filter for the residence time of the particle beam.

12. The method of claim 10, wherein the control variable comprises a residence time of a particle beam on a corresponding point of the surface during irradiation, and the external constraints comprise gradient limitations to the residence time of the particle beam.

13. The method of claim 1, wherein the particles are irradiated onto the surface of the optical element with a predefined optical footprint and eigenfunctions assigned to the eigenvalues satisfy boundary conditions adapted to the optical footprint.

14. A method, comprising:
measuring a wavefront aberration of a projection lens of a microlithographic exposure apparatus;
demounting a first optical element of the projection lens;
changing the shape of the surface of a second optical element via a method comprising:
modelling a problem of determining a resulting change of a surface shape of the second optical element from a control variable of a particle irradiation;
determining a predefinition for the control variable of the particle irradiation from a predefined desired change of a surface shape of the second optical element by ascertaining an extremum of a merit function; and
irradiating particles onto the surface of the second optical element with a locally resolved effect distribution corresponding to the determined predefinition for the control variable, thereby producing local surface changes at the surface of the second optical element; and
installing the second optical element instead of the first optical element into the projection lens,
wherein:
ascertaining of the extremum corresponds to a solution of an Euler equation;
the Euler equation defines an integral operator;
eigenvalues of the integral operator are determined; and
the predefinition is a linear combination of a finite number of eigenfunctions of the integral operator.

15. The method of claim 14, wherein modelling comprises carrying out a convolution of the control variable with a tool function describing an effect potential of a particle irradiation unit effecting the particle irradiation.

16. The method of claim 14, wherein the eigenvalues of the eigenfunctions in each case do not fall below a predefined limit value.

17. The method of claim 14, wherein a magnitude of the eigenvalues of the integral operator corresponds in each case to an efficiency of a particle irradiation unit on the surface of the second optical element in relation to a respectively assigned structure of a shape changed to be produced in the surface.

18. The method of claim 14, wherein the integral operator is calculated numerically as a diagonal matrix.

19. The method of claim 14, wherein modelling leads to an ill-defined inverse function configured to select a suitable solution from a cluster of solutions to an ill-defined inverse problem.

20. A method, comprising:
modelling a problem of determining a resulting change of a surface shape of an optical element from a control variable of a particle irradiation;
determining a predefinition for a control variable of a particle irradiation from a predefined desired change of a surface shape of an optical element by ascertaining an extremum of a merit function; and
irradiating particles onto the surface of the optical element with a locally resolved effect distribution corresponding to a determined predefinition for the control variable, thereby producing local surface changes at the surface of the optical element,
wherein:
ascertaining of the extremum corresponds to a solution of an Euler equation;
the Euler equation defines an integral operator;
eigenvalues of the integral operator are determined; and the predefinition is a linear combination of a finite number of eigenfunctions of the integral operator.

* * * * *

UNITED STATES PATENT AND TRADEMARK OFFICE
CERTIFICATE OF CORRECTION

PATENT NO. : 10,859,819 B2  
APPLICATION NO. : 16/459853  
DATED : December 8, 2020  
INVENTOR(S) : Pauls et al.

It is certified that error appears in the above-identified patent and that said Letters Patent is hereby corrected as shown below:

On the Title Page

Page 2, Column 1 (Other Publications), Line 1, delete "Hank," and insert -- Hanke, --;

In the Specification

Column 2, Line 20, delete "numbers" and insert -- numbers. --;

Column 2, Line 40, delete "Tichonov" and insert -- Tikhonov --;

Column 8, Line 33 (Approx.), delete "$K \cdot \Psi_n(x) = \lambda_n\ 19\ \Psi_n(x)$" and insert -- $K \cdot \Psi_n(x) = \lambda_n \cdot \Psi_n(x)$ --;

Column 9, Line 18 (Approx.), after " $\tilde{h}(x)\ _{,,} =\ " \int_{-\infty}^{\infty} f_\sigma(x-x')t(x')\,dx'$ " insert -- . --;

Column 9, Line 27 (Approx.), delete "$L^1$-norm," and insert -- $L^p$-norm, --;

Column 9, Line 59 (Approx.), after " $(A^*(L_f,\sigma)f)(x) = \int_{-L}^{L} f_\sigma(x-x')\chi_{[-L_f,L_f]}(x')\,dx'$ " insert -- . --;

Column 9, Line 63 (Approx.), after "$\tilde{h}$" delete "," and insert -- . --;

Column 9, Lines 66-67 (Approx.), delete "$K(L_f,\sigma) = A^*(L_f,\sigma)A(L_f,\sigma)A(L_f,\sigma)$" and insert -- $K(L_f,\sigma) = A^*(L_f,\sigma)A(L_f,\sigma)$ --;

Signed and Sealed this  
Twenty-third Day of February, 2021

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 10,859,819 B2

Column 10, Line 33 (Approx.), after "$\lambda_1 < \int_{-\infty}^{\infty} f_\sigma(x)\, dx = 1$" insert -- . --;

Column 11, Line 17 (Approx.), after "*W(cos ωx)=e$^{-ω2}$ cos ωx*" insert -- . --;

Column 11, Line 20, delete "a" and insert -- σ --;

Column 11, Line 38 (Approx.), delete "$\mathbb{R}$ ½" and insert -- $\mathbb{R} + \frac{1}{2}$ --;

Column 11, Line 45, delete "φ$_n$(x)" and insert -- Φ$_n$(x) --;

In the Claims

Column 13, Line 49, Claim 9, delete "Tichonov" and insert -- Tikhonov --.